(12) United States Patent
Huang

(10) Patent No.: US 9,223,111 B2
(45) Date of Patent: Dec. 29, 2015

(54) ZOOM LENS AND CAM FRAME THEREOF

(71) Applicants: Sintai Optical (Shenzhen) Co., Ltd., Shenzhen, Guandong Province (CN); Asia Optical International Ltd., Tortola (GB)

(72) Inventor: Chun-Hung Huang, Taichung (TW)

(73) Assignees: SINTAI OPTICAL (SHENZHEN) CO., LTD., Shenzhen, Guandong Province (CN); ASIA OPTICAL INTERNATIONAL LTD., Tortola (VG)

( * ) Notice: Subject to any disclaimer, the term of this patent is extended or adjusted under 35 U.S.C. 154(b) by 12 days.

(21) Appl. No.: 14/260,380

(22) Filed: Apr. 24, 2014

(65) Prior Publication Data
US 2014/0320979 A1 Oct. 30, 2014

(30) Foreign Application Priority Data
Apr. 25, 2013 (TW) .............................. 102114763 A

(51) Int. Cl.
*G02B 15/14* (2006.01)
*G02B 7/10* (2006.01)

(52) U.S. Cl.
CPC ...................................... *G02B 7/102* (2013.01)

(58) Field of Classification Search
CPC .................................. G02B 7/04; G02B 7/102
See application file for complete search history.

(56) References Cited

U.S. PATENT DOCUMENTS 5,373,397 A * 12/1994 Satoh et al. .................... 359/699
6,035,136 A * 3/2000 Hayashi et al. ................. 396/72

* cited by examiner

*Primary Examiner* — Joseph P Martinez
(74) *Attorney, Agent, or Firm* — McClure, Qualey & Rodack, LLP

(57) ABSTRACT

A cam frame of a zoom lens is provided. The cam frame includes an end surface, a first cam groove including a first connecting portion, a second connecting portion and a zooming-collapsing operation portion connected between the first connecting portion and the second connecting portion, an introducing groove connecting the end surface and the first connecting portion, a second cam groove, and a first connecting groove connecting the second connecting portion and the second cam groove.

10 Claims, 5 Drawing Sheets

ZOOM LENS AND CAM FRAME THEREOF

BACKGROUND OF THE INVENTION

1. Field of the Invention

The invention relates to a zoom lens and a cam frame thereof

2. Description of the Related Art

Typically, a cam frame of a zoom lens has a plurality of cam grooves. Referring to FIG. 1, for example, a cam frame 21 has three identical sets of cam grooves. The first set of cam grooves includes a first cam groove 215, a second cam groove 214 and a third cam groove 213. The second set of cam grooves includes a first cam groove 215', a second cam groove 214' and a third cam groove 213'. The third set of cam grooves includes a first cam groove 215", a second cam groove 214" and a third cam groove 213".

To introduce the pins (not shown) of lens groups into the cam grooves, the first set of cam grooves has an introducing groove 211 connecting the first cam groove 215, the second cam groove 214 and the third cam groove 213. Similarly, the second set of cam grooves has an introducing groove 211' connecting the first cam groove 215', the second cam groove 214' and the third cam groove 213', and the third set of cam grooves has an introducing groove 211" connecting the first cam groove 215", the second cam groove 214" and the third cam groove 213". By such arrangements, the pins of each lens groups can be guided by the introducing grooves 211, 211' and 211" to engage the third cam grooves 213, 213', 213", the second cam grooves 214, 214', 214" and the first cam grooves 215, 215', 215".

As shown in FIG. 1, the first set of cam grooves 215, 214 and 213 are formed in region Z1, the second set of cam grooves 215', 214' and 213' are formed in region Z2 and the third set of cam grooves 215", 214" and 213" are formed in region Z3. The regions Z1, Z2 and Z3 do not overlap each other.

Zoom lens is developed to have higher lens magnification, which requires larger displacements of each lens groups in zooming operation. To achieve this, increased lengths of the cam grooves and overlapped regions Z1, Z2 and Z3 are required. However, the cam grooves in one region may interfere the introducing groove in another region. For example, when the region Z1 overlaps the region Z2, the first set of cam grooves 215, 214 and 213 in the region Z1 may interfere the introducing groove 211' that influences movements of the pin of the lens group in zooming operation.

BRIEF SUMMARY OF THE INVENTION

The invention provides a cam frame. The cam frame in accordance with an exemplary embodiment of the invention includes an end surface, a first cam groove including a first connecting portion, a second connecting portion and a zooming-collapsing operation portion connected between the first connecting portion and the second connecting portion, an introducing groove connecting the end surface and the first connecting portion, a second cam groove, and a first connecting groove connecting the second connecting portion and the second cam groove.

The exemplary embodiment further includes a third cam groove connected to the first connecting groove.

The exemplary embodiment further includes a periphery surface having a plurality of regions, wherein the first cam groove, the second cam groove and the third cam groove are formed on each of the regions, and the regions overlap each other.

The exemplary embodiment further includes a third cam groove and a second connecting groove connecting the second connecting portion and the third cam groove.

The exemplary embodiment further includes a periphery surface having a plurality of regions, wherein the first cam groove, the second cam groove and the third groove are formed on each of the regions, and the regions overlap each other.

The invention provides a zoom lens. The zoom lens in accordance with an exemplary embodiment of the invention includes a cam frame, a sliding frame and a plurality of lens groups. The cam frame includes an end surface, a first cam groove, an introducing groove, a second cam groove and a first connecting groove, wherein the first cam groove comprises a first connecting portion, a second connecting portion and a zooming-collapsing operation portion connected between the first connecting portion and the second connecting portion, the introducing groove connecting the end surface and the first connecting portion, and the first connecting groove connecting the second connecting portion and the second cam groove. The sliding frame is disposed within the cam frame and includes a plurality of sliding grooves. The lens groups include a plurality of pins extending through the sliding grooves to slidably engage the first cam groove and the second cam groove.

In the exemplary embodiment, the cam frame further includes a third cam groove connected to the first connecting groove.

In the exemplary embodiment, the cam frame further includes a periphery surface having a plurality of regions, wherein the first cam groove, the second cam groove and the third groove are formed on each of the regions, and the regions overlap each other.

In the exemplary embodiment, the cam frame further includes a third cam groove connected to the first connecting groove.

In the exemplary embodiment, the cam frame further includes a periphery surface having a plurality of regions, wherein the first cam groove, the second cam groove and the third groove are formed on each of the regions, and the regions overlap each other.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
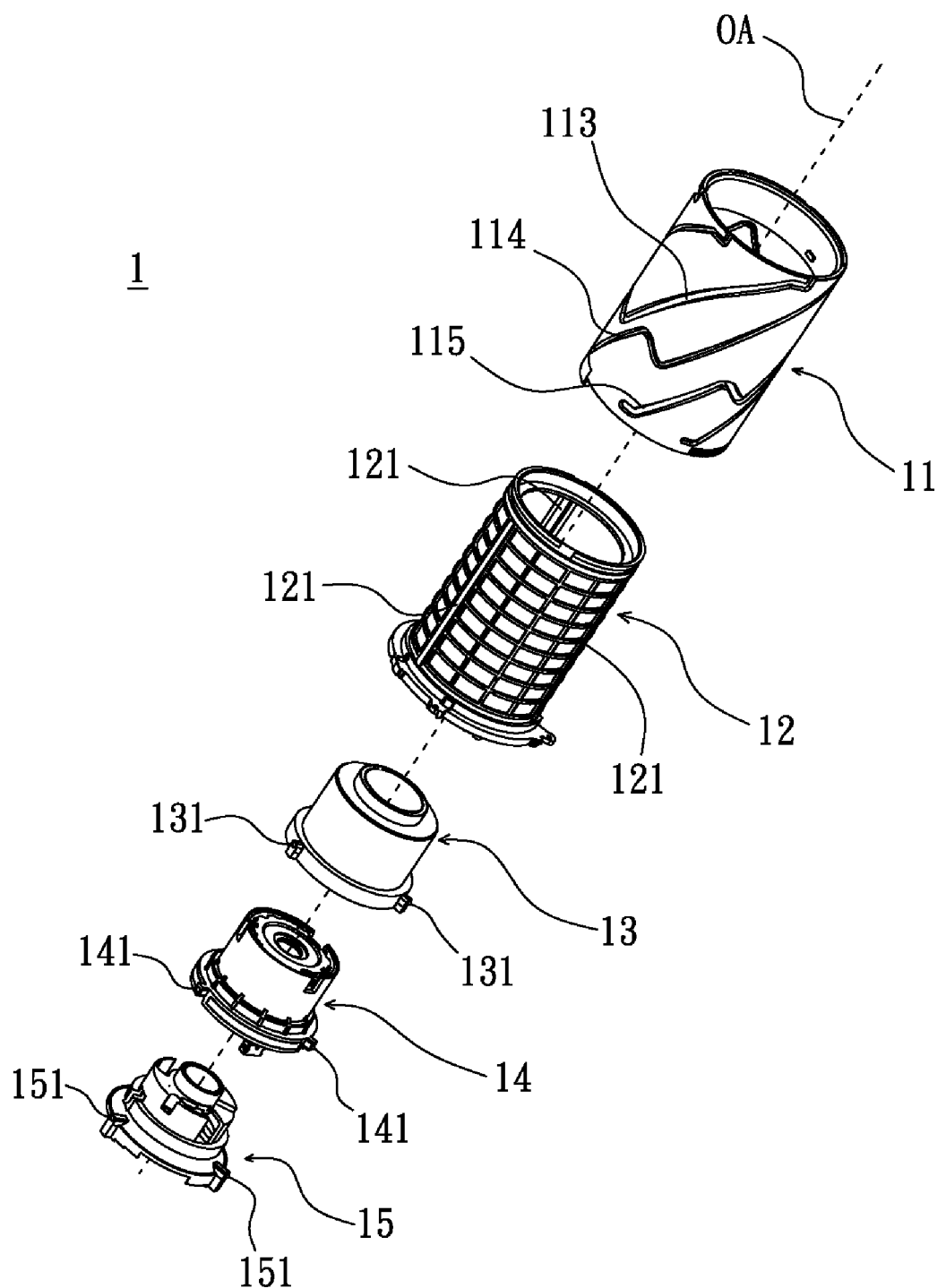
FIG. 2 is a perspective exploded view of a first embodiment of a zoom lens of the invention.
Figure 3:
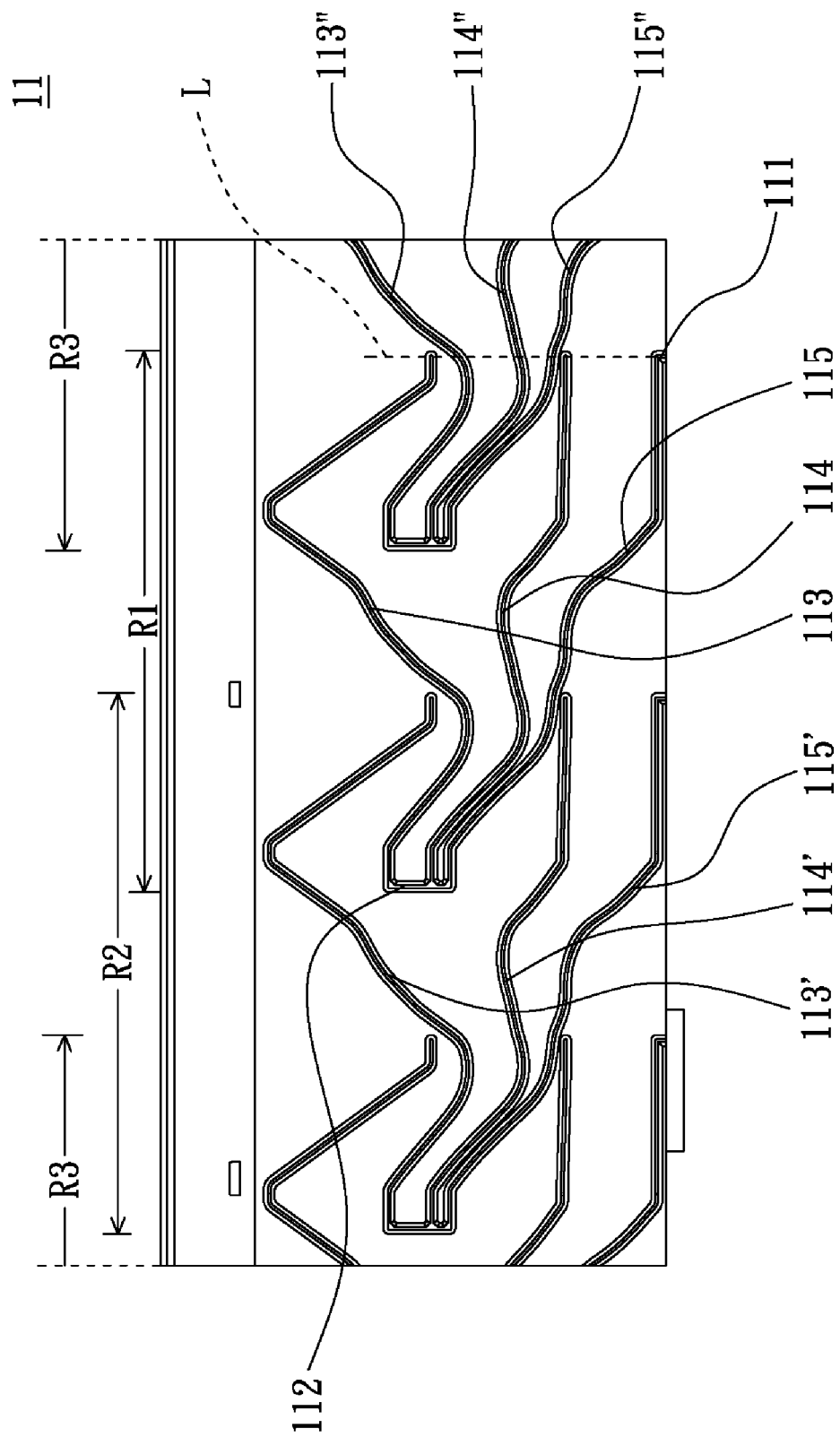
FIG. 3 depicts an unrolled cam frame of the first embodiment of a zoom lens of the invention.

Referring to FIG. 2 which depicts a zoom lens 1 of the invention, wherein only the elements related to zooming operation are shown. The zoom lens 1 includes a cam frame 11, a sliding frame 12 and a plurality of lens groups (including lens and frame) 13, 14 and 15. In this embodiment, the cam frame 11 has a first cam groove 115, 115' and 115" (cam grooves 115' and 115" are shown in FIG. 3), a second cam groove 114, 114' and 114" (cam grooves 114' and 114" are shown in FIG. 3) and a third cam groove 113, 113' and 113" (cam grooves 113' and 113" are shown in FIG. 3). Three sliding grooves 121 parallel to an optical axis OA are formed on the sliding frame 12. The lens group 13 has three pins 131, the lens group 14 has three pins 141 and the lens group 15 has three pins 151.

The sliding frame 12 is disposed within the cam frame 11, and the lens groups 13, 14 and 15 are disposed within the sliding frame 12 along the optical axis OA. The pins 131, 141 and 151 extends through the sliding grooves 121 to slidably engages the third cam groove 113, the second cam groove 114 and the first cam groove 115 respectively.

A zoom motor (not shown) rotates the cam frame 11, whereby the pins 131, 141 and 151 are moved along the third cam groove 113, the second cam groove 114 and the first cam groove 115 so as to move the lens group 13, 14 and 15. Since the pins 131, 141 and 151 extend through the sliding grooves 121 to engage the third cam groove 113, the second cam groove 114 and the first cam groove 115, when the pins 131, 141 and 151 are moved, the pins 131, 141 and 151 are constrained by the sliding grooves 121 so that the lens groups 13, 14 and 15 are moved along the optical axis OA to change the distance between the lens group 13, 14 and 15 for zooming operation.

In this embodiment, three sliding grooves 121 are disposed on the sliding frame 121 and circumferentially equally-spaced thereon. Each sliding groove 121 has an angular distance of 120° to other sliding grooves 121.

The three pins 131 are disposed on a periphery of the lens group 13 and correspond to the sliding groove 121. Similarly, each pin 131 has an angular distance of 120° to other pins 131. The three pins 141 are disposed on a periphery of the lens group 14, and each pin 141 has an angular distance of 120° to other pins 141. The three pins 151 are disposed on a periphery of the lens group 14, and each pin 151 has an angular distance of 120° to other pins 151.

FIG. 3 depicts the cam frame 11 which is unrolled. As shown, there are three sets of cam grooves formed on the cam frame 11. The first set of cam grooves includes a first cam groove 115, a second cam groove 114 and a third cam groove 113. The second set of cam grooves includes a first cam groove 115', a second cam groove 114' and a third cam groove 113'. The third set of cam grooves includes a first cam groove 115", a second cam groove 114" and a third cam groove 113". The first set of cam grooves 115, 114 and 113 are formed on a region R1, the second set of cam grooves 115', 114' and 113' are formed on a region R2, and the third set of cam grooves 115", 114" and 113" are formed on a region R3. It is noted that regions R1, R2 and R3 overlap.

As the three sets of cam grooves are identical, the first set of cam groove 115, 114 and 113 is described as an example.

Figure 4:
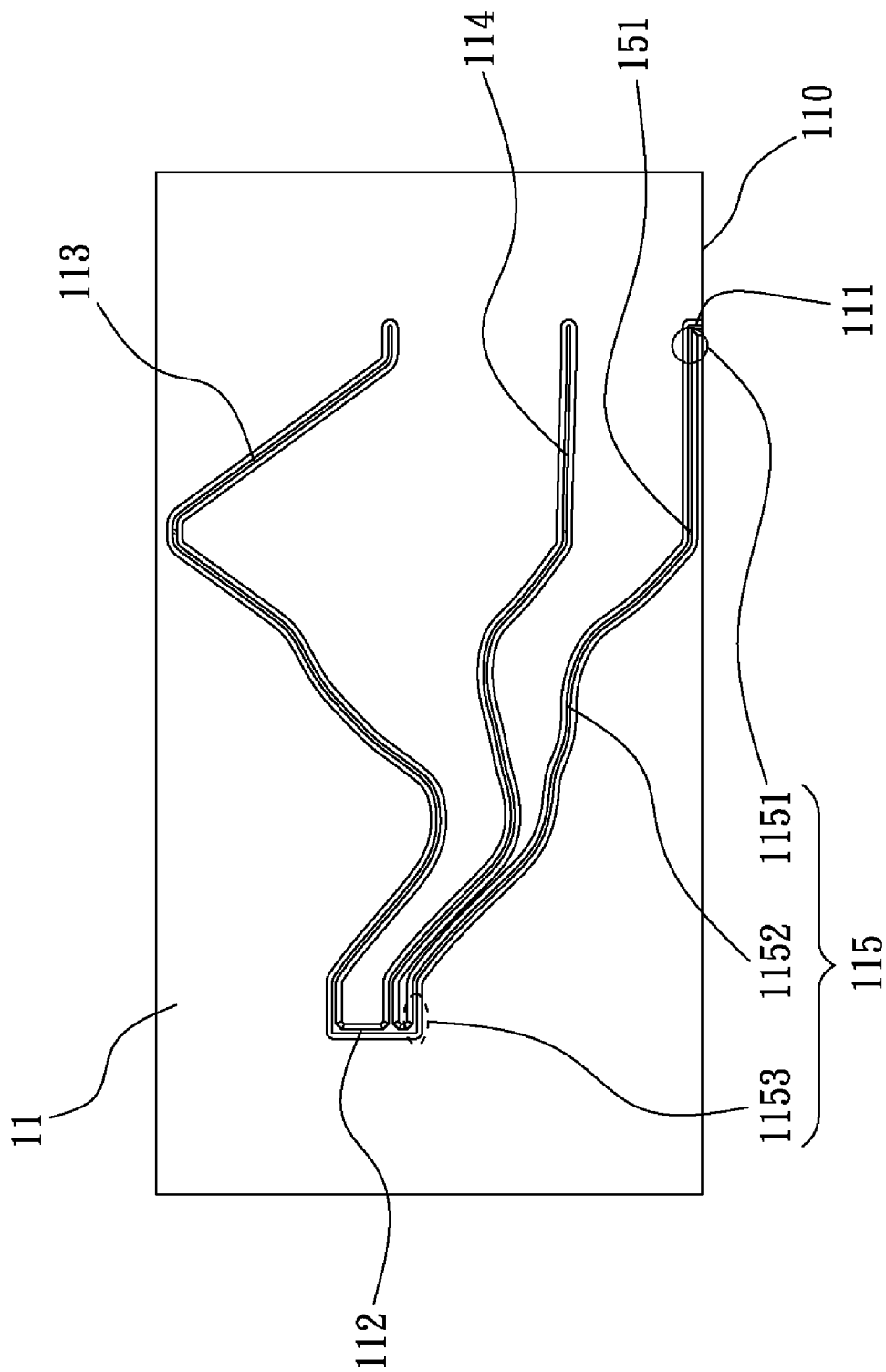
FIG. 4 is a partial diagram of FIG. 3.

Referring to FIG. 4, the first cam groove 115 includes a zooming-collapsing operation portion 1152, a first connecting portion 1151 and a second connecting portion 1153. The zooming-collapsing operation portion 1152 is disposed between the first connecting portion 1151 and the second connecting portion 1153 and connects the first connecting portion 1151 and the second connecting portion 1153. When the zooming operation is performed, the pin 151 moves along the zooming-collapsing operation portion 1152. The cam frame 11 further includes a first connecting groove 112 and an introducing groove 111. The introducing groove 111 connects the first connecting portion 1151 of the first cam groove 115 and an end surface 110 of the cam frame 11. The first connecting groove 112 connects the second connecting portion 1153 of the first cam groove 115 to the second cam groove 114 and the third cam groove 113.

The lens groups 13, 14 and 15 are sequentially fitted to the cam frame 11. To fit the lens group 13, the pins 131 of the lens group 13 is guided by the introducing groove 111 to move along the first cam groove 115 and the first connecting groove 112 and finally enter the third cam groove 113. To fit the lens group 14, the pins 141 of the lens group 14 is guided by the introducing groove 111 to move along the first cam groove 115 and enter the second cam groove 114. To fit the lens group 15, the pins 151 of the lens group 15 is guided by the introducing groove 111 to enter the first cam groove 115.

The first connecting portion 1151 and the second connecting portion 1153 are disposed at two opposite ends of the zooming-collapsing operation portion 1152, whereby the movement of the pins 151, 141 and 131 are not affected in zooming operation.

Figure 1:
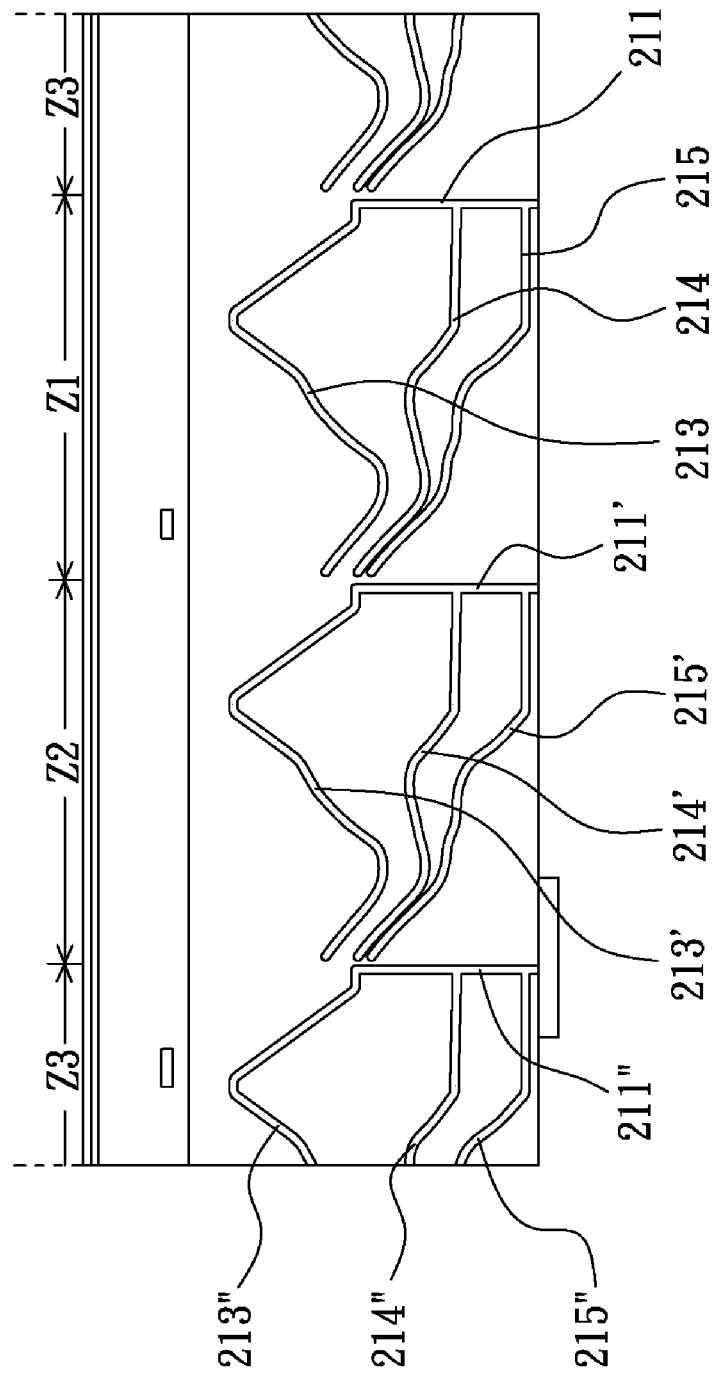
FIG. 1 depicts an unrolled cam frame of a conventional zoom lens.

As shown in FIG. 3, the regions R1, R2 and R3 overlap each other. If the introducing groove 111 of the conventional structure as shown in FIG. 1 rather than the first connecting groove 112 of the invention is used to connect the first, second, and third cam groove 115, 114, and 113, then interference between the grooves cannot be avoided. Specifically, if the introducing groove 111 extends along the dashed line L to connect the second and third cam grooves 114 and 113, then the introducing groove 111 will interfere with the third set of cam grooves 115", 114" and 113" so as to affect the movements of the pins 151, 141 and 131.

In this embodiment, the introducing groove 111 only connects to the first cam groove 115, while the first connecting groove 112 connects the first, second and third cam grooves 115, 114 and 113. Therefore, interference between the introducing groove 111 and the third set of cam grooves 115", 114" and 113" can be avoided even when the regions R1, R2 and R3 overlap each other.

Figure 5:
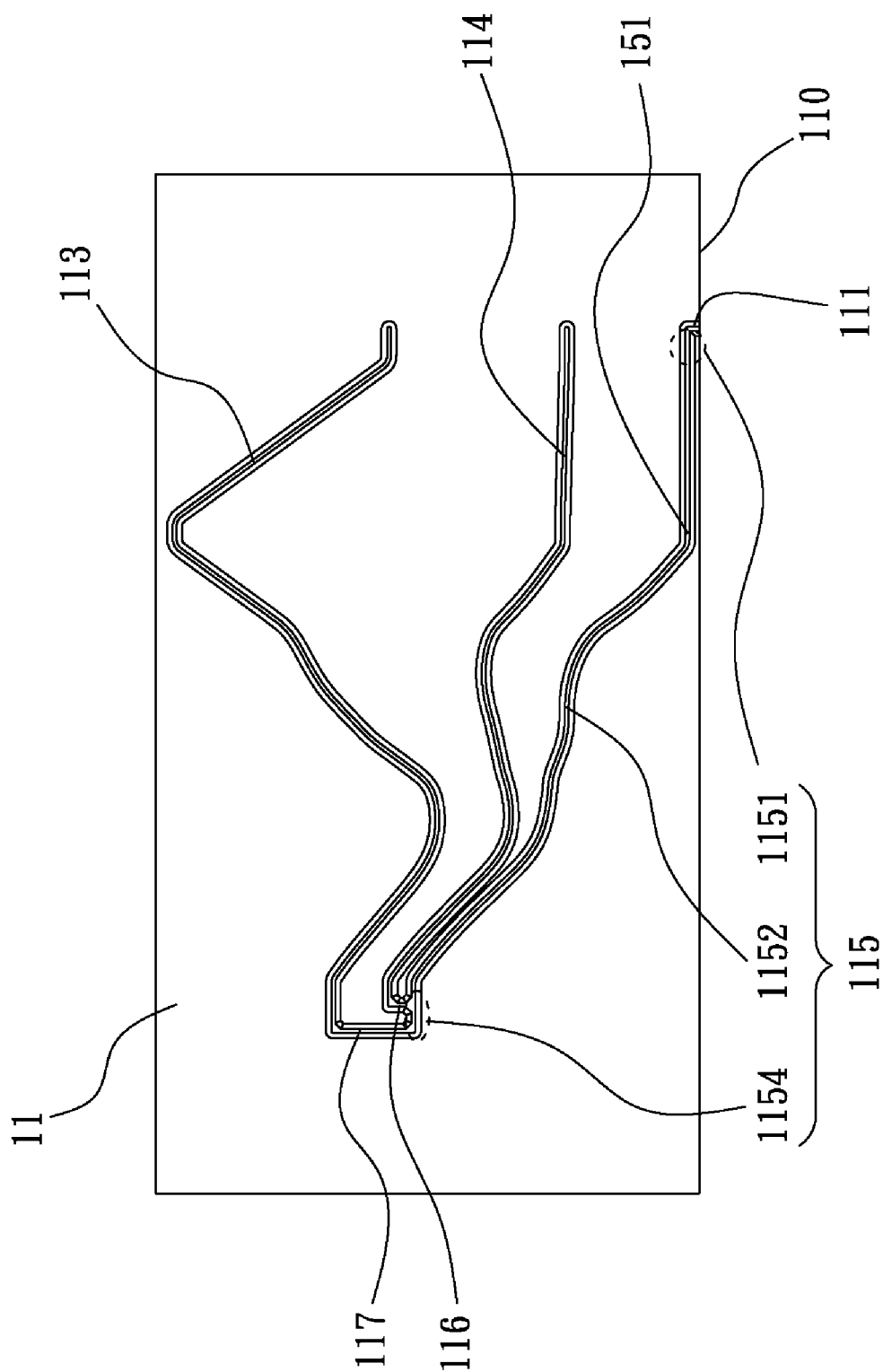
FIG. 5 depicts an unrolled cam frame of a second embodiment of a zoom lens of the invention.

FIG. 5 depicts another embodiment of the cam frame of the invention. The description of elements of this embodiment identical to the elements of the embodiment of FIG. 4 is omitted. As shown, the cam frame 11 includes a first cam groove 115, a second cam groove 114 and a third cam groove 113. The first cam groove 115 includes a zooming-collapsing operation portion 1152, a first connecting portion 1151 and a second connecting portion 1154. The zooming-collapsing operation portion 1152 is disposed between the first connecting portion 1151 and the second connecting portion 1154 and connects the first connecting portion 1151 and the second connecting portion 1154.

The cam frame 11 further includes a first connecting groove 116, a second connecting groove 117 and an introducing groove 111. The introducing groove 111 connects the first connecting portion 1151 of the first cam groove 115 and the end surface 110 of the cam frame 11. The first connecting groove 116 connects the second connecting portion 1154 of the first cam groove 115 and the second cam groove 114. The second connecting groove 117 connects the second connecting portion 1154 of the first cam groove 115 and the third cam groove 113.

In this embodiment, the first connecting groove 116 connects the first cam groove 115 and the second cam groove 114. The cam frame 11 further includes a second connecting groove 117 connecting the first cam groove 115 and the third cam groove 113. By such arrangements, the lens groups can also be fitted to the cam frame 11.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A cam frame, comprising:
   an end surface;
   a first cam groove comprising a first connecting portion, a second connecting portion and a zooming-collapsing operation portion connected between the first connecting portion and the second connecting portion;
   an introducing groove connecting the end surface and the first connecting portion;
   a second cam groove;
   a first connecting groove connecting the second connecting portion and the second cam groove.

2. The cam frame as claimed in claim 1 further comprising a third cam groove connected to the first connecting groove.

3. The cam frame as claimed in claim 2 further comprising a periphery surface having a plurality of regions, wherein the first cam groove, the second cam groove and the third cam groove are formed on each of the regions, and the regions overlap each other.

4. The cam frame as claimed in claim 1 further comprising a third cam groove and a second connecting groove connecting the second connecting portion and the third cam groove.

5. The cam frame as claimed in claim 4 further comprising a periphery surface having a plurality of regions, wherein the first cam groove, the second cam groove and the third groove are formed on each of the regions, and the regions overlap each other.

6. A zoom lens, comprising:
   a cam frame comprising an end surface, a first cam groove, an introducing groove, a second cam groove and a first connecting groove, wherein the first cam groove comprises a first connecting portion, a second connecting portion and a zooming-collapsing operation portion connected between the first connecting portion and the second connecting portion, the introducing groove connects the end surface and the first connecting portion, and the first connecting groove connects the second connecting portion and the second cam groove;
   a sliding frame disposed within the cam frame and comprising a plurality of sliding grooves;
   a plurality of lens groups comprising a plurality of pins extending through the sliding grooves to slidably engage the first cam groove and the second cam groove.

7. The zoom lens as claimed in claim 6, wherein the cam frame further comprises a third cam groove connected to the first connecting groove.

8. The zoom lens as claimed in claim 7, wherein the cam frame further comprises a periphery surface having a plurality of regions, wherein the first cam groove, the second cam groove and the third groove are formed on each of the regions, and the regions overlap each other.

9. The zoom lens as claimed in claim 6, wherein the cam frame further comprises a third cam groove and a second connecting groove connecting the second connecting portion and the third cam groove.

10. The zoom lens as claimed in claim 9, wherein the cam frame further comprises a periphery surface having a plurality of regions, wherein the first cam groove, the second cam groove and the third groove are formed on each of the regions, and the regions overlap each other.

* * * * *